United States Patent [19]
Yamazaki

[11] Patent Number: 5,648,946
[45] Date of Patent: Jul. 15, 1997

[54] OPTICAL PICK-UP APPARATUS WITH HOLOGRAPHIC OPTICAL ELEMENT TO DIFFRACT BOTH FORWARD AND RETURN LIGHT BEAMS

[75] Inventor: Takeshi Yamazaki, Hachioji, Japan

[73] Assignee: Olympus Optical Co., Ltd., Tokyo, Japan

[21] Appl. No.: 341,087

[22] Filed: Nov. 17, 1994

[30] Foreign Application Priority Data

Apr. 28, 1992 [JP] Japan .................. 4-110022

[51] Int. Cl.$^6$ .................................................. G11B 7/09
[52] U.S. Cl. .................. 369/44.23; 369/44.37; 369/112; 369/103
[58] Field of Search ..................... 369/103, 109, 369/112, 44.12, 44.14, 44.23, 44.37

[56] References Cited

U.S. PATENT DOCUMENTS

| | | | |
|---|---|---|---|
| 5,049,732 | 9/1991 | Nagahama et al. | 369/44.37 X |
| 5,315,574 | 5/1994 | Saimi et al. | 369/44.37 X |
| 5,391,865 | 2/1995 | Kurata et al. | 369/44.37 X |
| 5,406,543 | 4/1995 | Kobayashi et al. | 369/109 X |
| 5,446,719 | 8/1995 | Yoshida et al. | 369/44.37 X |

FOREIGN PATENT DOCUMENTS

| | | | |
|---|---|---|---|
| 1-260644 | 10/1989 | Japan | 369/44.37 |
| 5-20711 | 1/1993 | Japan | 369/44.37 |
| 0120755 | 5/1993 | Japan . | |
| 0298721 | 11/1993 | Japan . | |

*Primary Examiner*—Thang V. Tran
*Attorney, Agent, or Firm*—Watson Cole Stevens Davis, P.L.L.C.

[57] ABSTRACT

An optical pick-up apparatus for recording and/or reading information on and/or from an optical record medium including a semiconductor substrate, a semiconductor laser arranged on the semiconductor substrate, plurality of photodetectors formed in the surface of the semiconductor substrate, a diffraction gratings dividing a laser beam into main beam and two sub-beams, an objective lens projecting the main and sub-beams onto the record medium and directing these beams reflected by the record medium toward a hologram which diffracts each of the main and sub-beams into ±1-order beams which are received by the photodetectors. The apparatus is constructed to satisfy the following conditions:

$$NA \cdot d < |L \cdot \beta|$$

$$0.04 \text{ mm} > d/\beta^2 > 0.01 \text{ mm}$$

wherein L mm is a distance between a spot of the main beam and a spot of a sub-beam on the record medium, NA is a numerical aperture of the objective lens on a side of the semiconductor laser, $\beta$ is a magnification of the objective lens viewed from the record medium to the semiconductor laser and d is a deviation of focal points of +1-order beams and −1-order beams viewed along an optical axis.

10 Claims, 6 Drawing Sheets

FIG. 1
PRIOR ART
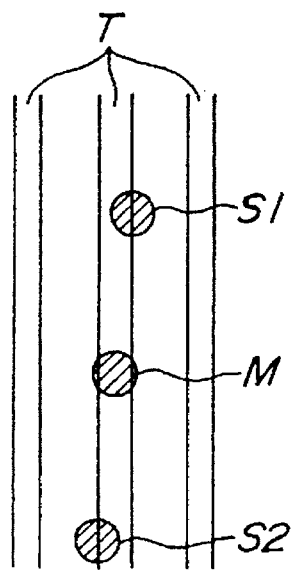
FIG. 2A
PRIOR ART
FIG. 2B
PRIOR ART
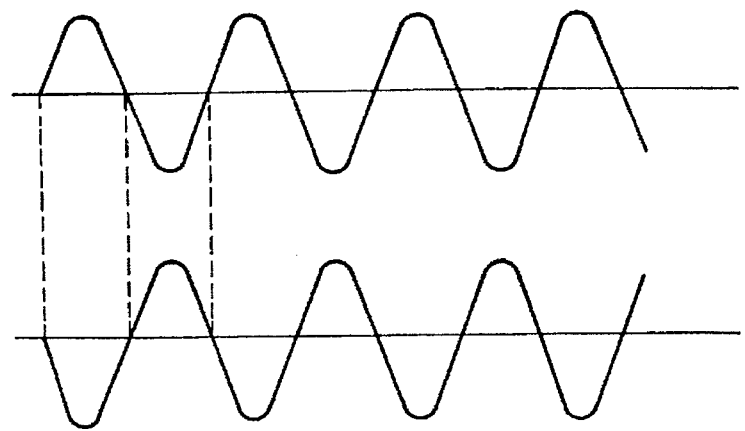

OPTICAL PICK-UP APPARATUS WITH HOLOGRAPHIC OPTICAL ELEMENT TO DIFFRACT BOTH FORWARD AND RETURN LIGHT BEAMS

BACKGROUND OF THE INVENTION

1. Field of the Invention

The present invention relates to an optical pick-up apparatus for recording and/or reading information on and/or from an optical record medium such as optical disk.

There have been proposed various kinds of optical pick-up apparatuses for use in an optical recording and/or reproducing apparatus. In an optical pick-up apparatus of a so-called three beam type, one main beam and two sub-beams are made incident upon an optical record medium by means of a converging optical system including an objective lens, a focusing error signal is derived from the main beam reflected by the optical record medium by a beam size method and a tracking error signal is obtained from the two sub-beams reflected by the optical record medium.

In case of detecting the tracking error by the above mentioned three beam method, the main beam M is made incident upon a center of a track T on an optical record medium and two sub-beams S1 and S2 are made incident upon respective edges of the track T as shown in FIG. 1. When the optical record medium and the three beams are moved relative to each other in a tracking direction which is perpendicular to a track direction in which the information track T extends, a signal obtained from a photodetector receiving one of the sub-beams S1 changes as illustrated in FIG. 2A and a signal from a photodetector receiving the other sub-beam S2 changes as shown in FIG. 2B, so that a tracking error signal can be obtained by deriving a difference between these signals. These signals have opposite phases or a phase difference of these signals amounts to 180°, so that it is possible to obtain the tracking error signal having a large amplitude. During the adjustment or usage of the optical pick-up apparatus, the optical pick-up apparatus may be rotated about an optical axis which corresponds to a center of the main beam spot, so that the sub-beams might not be made incident upon the edges of the track T. Then, an amplitude of the output signals of the photodetector is reduced, and thus an amplitude of the tracking error signal is decreased. In this manner, the tracking error could not be detected at a high sensitivity. In order to mitigate such a drawback, it is desired to reduce a distance between the main beam spot and the sub-beams spots on the optical record medium in the track direction.

If the distance between the main beam spot and the sub-beam spots is shortened, the distance between the main beam spot and the sub-beam spots on the photo-detectors is also shortened, so that these beam spots interfere with each other. Then, not only the tracking error but also the focusing error and RF signal could not be detected correctly.

In Japanese Patent Application Laid-open Publication Kokai Sho 60-147941, there is described a solution for the above problem. In this solution, a concave lens is arranged in an optical path of the return beams reflected by the optical record medium and the distance between the main beam spot and the sub-beam spots on the photodetectors is increased. It is apparent that this solution requires the concave lens additionally, so that a cost and a size of the optical pick-up apparatus are increased.

In Japanese Patent Application Laid-open Publication Kokai Hei 4-248134 published on Sep. 3, 1992, there is proposed an optical pick-up apparatus of three beam type, in which the three return beams reflected by an optical record medium are diffracted by a hologram and ±1-order beams are received by photodetectors separately. In case of dividing the light beam by means of the hologram, a dividing angle cannot be large, so that it is very difficult to arrange the concave lens in optical paths of return beams between the hologram and the photodetectors. Therefore, the distance between the main beam spot and the sub-beam spot on the record medium could not be shortened sufficiently.

In order to avoid or mitigate the interference between the main beam spot and the sub-beam spots on the photodetectors, it is considered to increase a magnification of the converging optical system or to reduce a diameter of the three beam spots on the photodetectors is reduced. However, in the former solution, the optical path length becomes long and a size of the optical pick-up apparatus becomes large and in the latter solution a detectable range of the focusing error is limited.

SUMMARY OF THE INVENTION

The present invention has for its object to provide a novel and useful optical pick-up apparatus which is small in size and cheap in cost, while the focusing error can be detected over a wide range. According to the invention, an optical pick-up apparatus for recording and/or reading information on and/or from an optical record medium comprises:

a semiconductor substrate having a surface;

a semiconductor laser provided on said surface of semiconductor substrate and emitting a laser beam;

diffraction gratings for dividing said laser beam into a single main beam for recording and/or reading information on and/or from an optical record medium and first and second sub-beams for detecting a tracking error;

a converging optical system for projecting said main beam and first and second sub-beams emanating from said diffraction gratings onto said optical record medium as fine beam spots and receiving the main beam and first and second sub-beams reflected by said optical record medium;

a hologram means for diffracting the main beam and first and second sub-beams reflected by said optical record medium and received by said converging optical system into ±1-order main beams, ±1-order first sub-beams and ±1-order second sub-beams and giving said 1-order main and sub-beams and said −1-order main and sub-beams focal powers in opposite directions; and a photodetecting means including first and second photodetectors receiving said ±1-order main beams, third and fourth photodetectors receiving ±1-order first sub-beams and fifth and sixth photodetectors receiving ±1-order second sub-beams; wherein the optical pick-up apparatus is constructed to satisfy the following condition:

$$NA \cdot d < L \cdot \beta$$

wherein L mm is a distance between a spot of the main beam and a spot of a sub-beam on the optical record medium, NA is a numerical aperture of said converging optical system on a side of the semiconductor laser, $\beta$ is a magnification of said converging optical system viewed from the the optical record medium to the semiconductor laser and d is a deviation of focal points of +1-order beams and −1-order beams emanating from said hologram means viewed along an optical axis.

According to another aspect of the invention, an optical pick-up apparatus for recording and/or reading information on and/or from an optical record medium comprises:

a semiconductor substrate having a surface;

a semiconductor laser provided on said surface of semiconductor substrate and emitting a laser beam;

diffraction gratings for dividing said laser beam into a single main beam for recording and/or reading information on and/or from an optical record medium and first and second sub-beams for detecting a tracking error;

a converging optical system for projecting said main beam and first and second sub-beams emanating from said diffraction gratings onto said optical record medium and receiving the main beam and first and second sub-beams reflected by said optical record medium;

a hologram means for diffracting the main beam and first and second sub-beams reflected by said optical record medium and received by said converging optical system into ±1-order main beams, ±1-order first sub-beams and ±1-order second sub-beams and giving said +1-order main and sub-beams and said −1-order main and sub-beams astigmatisms in opposite directions; and a photodetecting means including first and second photodetectors receiving said ±1-order main beams, third and fourth photodetectors receiving ±1-order first sub-beams and fifth and sixth photodetectors receiving ±1-order second sub-beams; wherein the optical pick-up apparatus is constructed to satisfy the following condition;

$$NA \cdot s < |L \cdot \beta|$$

wherein L mm is a distance between a spot of the main beam and a spot of a sub-beam on the optical record medium, NA is a numerical aperture of said converging optical system on a side of the semiconductor laser, $\beta$ is a magnification of said converging optical system viewed from the the optical record medium to the semiconductor laser and s is an astigmatic difference of +1-order beams and −1-order beams emanating from said hologram means viewed along an optical axis.

In a preferable embodiment of the optical pick-up apparatus according to the invention, said apparatus is constructed to satisfy a condition of 0.04 mm>d/$\beta^2$>0.01 mm or 0.01 mm>s/$\beta^2$>0.04 mm.

When the above condition of NA·d<|L·$\beta$| is satisfied, the distance between the main beam spot and the sub-beam spot on the optical record medium can be shortened without using the concave lens and increasing the numerical aperture and magnification of the converging optical system, while the interference between the main beam spots and the sub-beam spots on the photodetecting means can be effectively avoided. Therefore, according to the invention, the optical pick-up apparatus can be small in size and cheap in cost, while the interference between the main beam spot and the sub-beam spots on the photodetecting means can be removed. In order to minimize the influence of the rotation of the optical pick-up apparatus about the optical axis, it is desired to reduce the parameter L as far as possible. If the converting optical system is selected, the parameters $\beta$ and NA are determined, so that the parameter L may be decreased by reducing the parameter d or s. However, it is apparent that the value of d or s relates to a detectable range of the focusing error and could not be made small. On the other hand, if the value of d or s is increased, the sensitivity of the focusing error detection is decreased. Therefore, in practice, there is a limitation for the value of d or s. According to the invention, it has been confirmed that when the condition of 0.04 mm>d/$\beta^2$>0.01 mm or 0.04 mm>s/$\beta^2$>0.01 mm is satisfied, the range of the focusing error detection can be set to a practically usable value.

BRIEF DESCRIPTION OF THE DRAWINGS

FIG. 1 is a schematic view showing a known optical pick-up apparatus of three beam type;

FIGS. 2A and 2B are signal waveforms obtained from sub-beams in the apparatus shown in FIG. 1;

DESCRIPTION OF THE PREFERRED EMBODIMENTS

Figure 3:
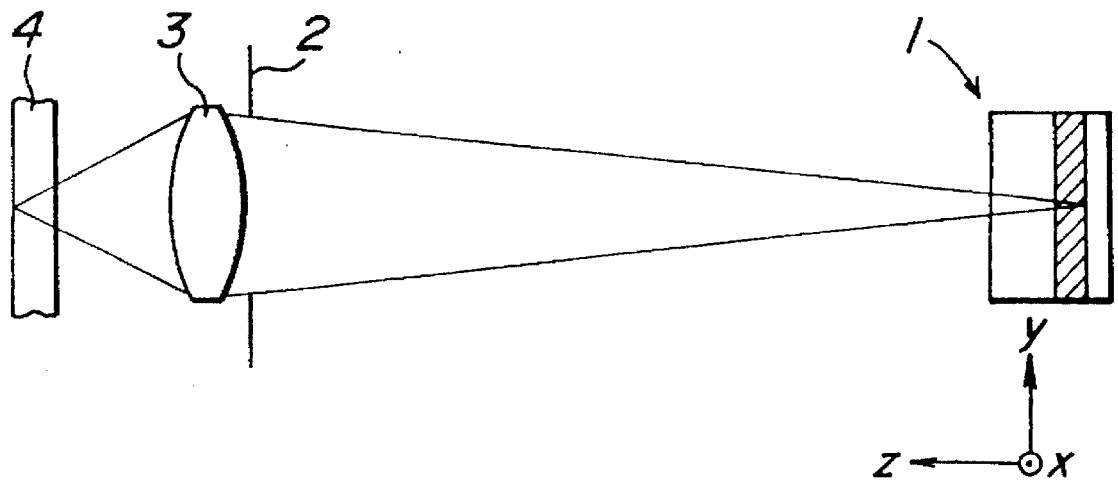
FIG. 3 is a schematic view illustrating an embodiment of the optical pick-up apparatus according to the invention.

FIG. 3 is a schematic cross sectional view showing an embodiment of the optical pick-up apparatus according to the invention. In the present embodiment, a semiconductor laser, photodetector and hologram are formed as a single unit 1. A laser beam emanating from the unit 1 is made incident upon an optical record medium 4 such as optical disk by means of stop 2 and objective lens 3. A return laser beam reflected by the optical record medium 4 is made incident upon the unit 1 along the same optical path along which the laser beam is made incident upon the optical record medium 4.

Figure 4:
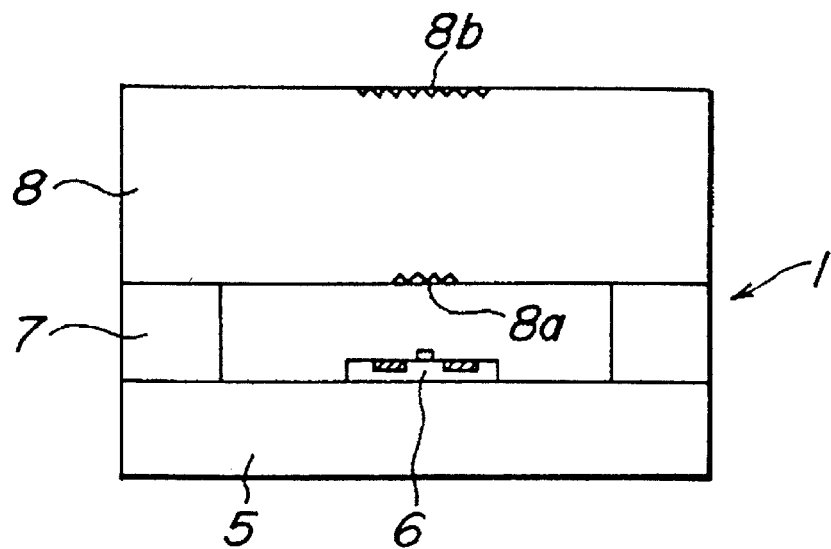
FIG. 4 is a schematic cross sectional view depicting an optical unit of the apparatus of FIG. 3.
Figure 5:
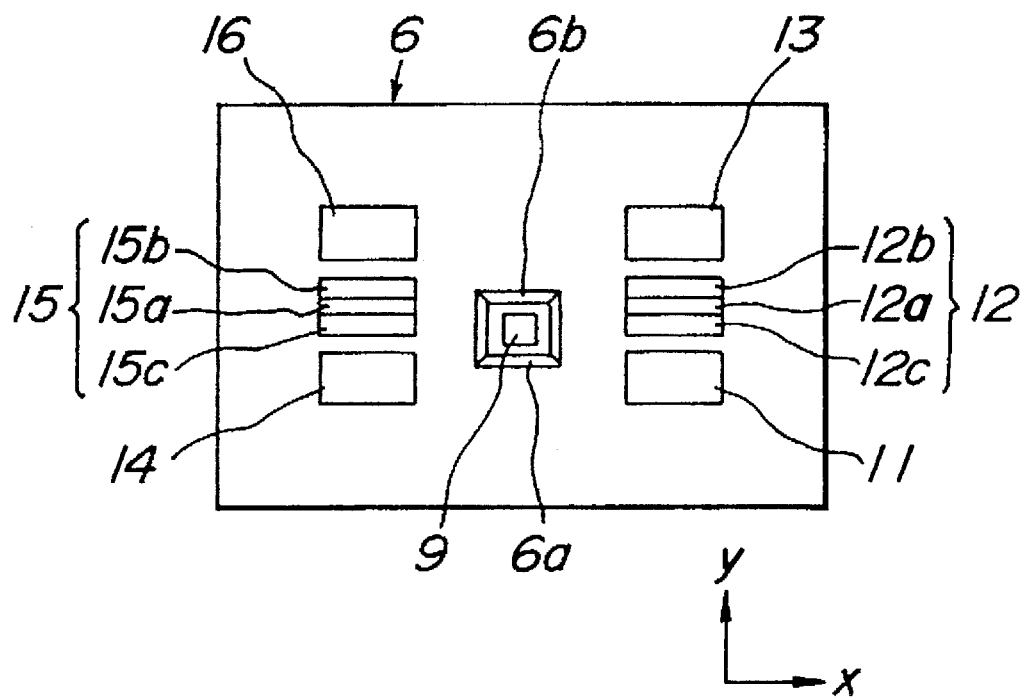
FIG. 5 is a plan view of the optical unit.
Figure 6:
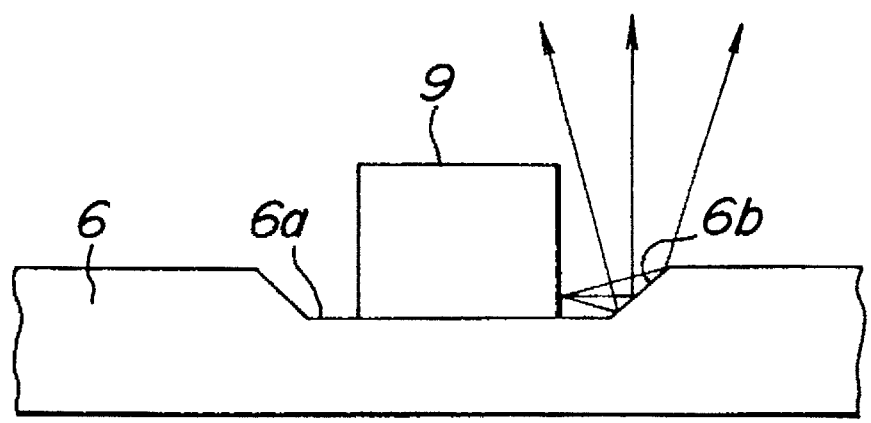
FIG. 6 is a schematic cross sectional view showing a part of the optical unit.

FIG. 4 is a schematic cross sectional view of the unit 1. The unit 1 comprises a base plate 5, a semiconductor substrate 6 placed on the base plate 5, a spacer 7 and a hologram optical element (HOE) 8 arranged above the semiconductor substrate 6 via the spacer 7. FIG. 5 is a plan view showing the detailed construction of the unit 1. As illustrated in FIG. 5, a semiconductor laser 9 is arranged on the semiconductor substrate 6 and photodetectors 11, 12, 13, and 14, 15, 16 are formed in a surface of the semiconductor substrate on both sides of the semiconductor laser viewed in a direction x. The photodetectors 11, 12 and 13 are separated from each other in a direction y perpendicular to the direction x, and similarly the photodetectors 14, 15 and 16 are separated from each other in the direction y. The middle photodetector 12 has three light receiving regions 12a, 12b and 12c divided in the direction y and the middle photodetector 15 includes three light receiving regions 15a, 15b and 15c divided in the direction y. In the present embodiment, the semiconductor laser 9 is placed on a bottom surface of a depression 6a formed in the surface of the semiconductor substrate 6. The depression 6a is formed by etching the surface of the semiconductor substrate, and during this etching process, there is formed an inclined side wall 6b which serves as a reflection mirror for reflecting the laser beam emitted by the semiconductor laser 9 in a direction perpendicular to the plane of the semiconductor substrate 6.

As shown in FIG. 4, the hologram optical element 8 includes diffraction gratings 8a formed in a surface of an optical block which faces with the semiconductor substrate 6. The laser beam emitted by the semiconductor laser 9 is divided into 0-order beam, +1-order beam and −1-order beam. It should be noted that the 0-order beam serves as a main beam for recording and/or reproducing the information on and/from the optical record medium 4 as well as for deriving the focusing error, and ±1-order beams serve as the sub-beams for deriving the tracking error. The hologram optical element 8 further comprises a hologram pattern 8b formed in a surface of the optical block which faces with the objective lens 3. The hologram pattern 8b serves to diffract the main and sub-beams reflected by the optical record medium 4 into ±1-order beams as well as to give these ±1-order beams focal powers in opposite directions. The hologram pattern 8b is formed to satisfy the following equation:

$$f(x,y)=Fx+Gx^2+Hy^2-n\lambda=0 \qquad (1)$$

wherein n is an integer number, λ is a wavelength of the laser beam, and F, G, H are constants.

The laser beam emitted by the semiconductor laser 9 is reflected by the reflection mirror formed by the side wall 6b of the depression and is made incident upon the diffraction gratings 8a. The laser beam is divided into the single main beam and two sub-beams by the diffraction gratings 8a. These three laser beams are projected on the optical record medium 4 by means of the stop 2 and objective lens 3 as fine spots as depicted in FIG. 1. The three beams reflected by the optical record medium 4 are made incident upon the hologram pattern 8b by means of the stop 2 and objective lens 3. Then, the main beam is divided into ±1-order main beams, the first sub-beam is divided into ±1-order first sub-beams, and the second sub-beam is divided into ±1-order second sub-beams, and these six beams are made incident upon the photodetectors. That is to say, the ±1-order main beams are made incident upon the middle photodetectors 12 and 15, respectively, and the ±1-order first sub-beams are made incident upon the photodetectors 11 and 14, respectively and the ±1-order second sub-beams are made incident upon the photodetectors 13 and 16, respectively. Therefore, the direction y corresponds to the track direction in which the information track extends on the optical record medium, and the direction x corresponds to the tracking direction perpendicular to the track direction y. As stated above, the hologram pattern 8b is formed to give the ±1-order beams the focal powers in opposite directions, so that the +1-order beams are focused at points before the surface of the semiconductor substrate 6 and −1-order beams are focused at points after the surface of the semiconductor substrate.

Figure 7:
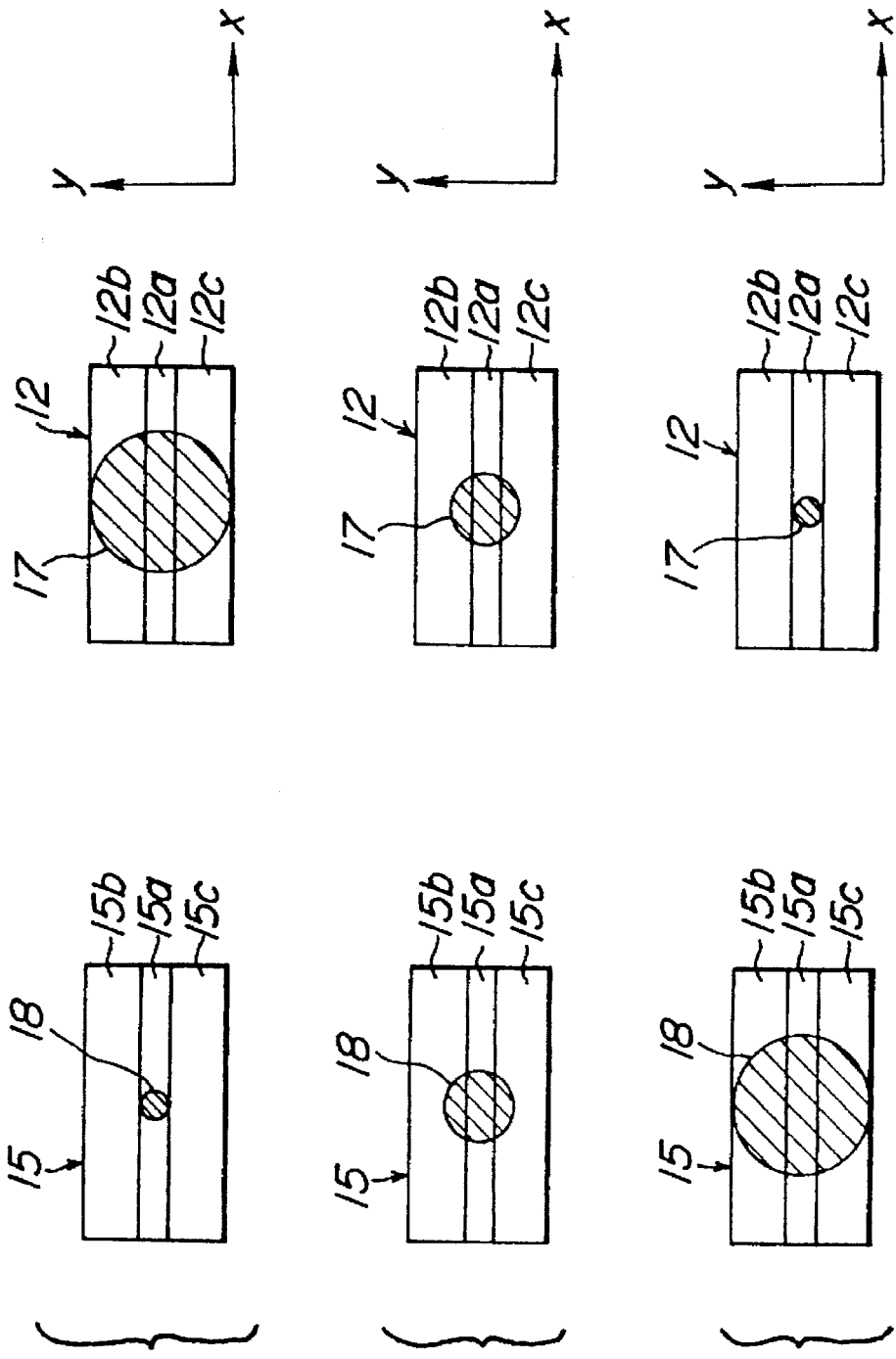
FIGS. 7A, 7B and 7C are schematic plan views illustrating beam spots on the photodetecting means.

When the objective lens 3 is in an in-focused position with respect to the optical record medium 4, spots 17 and 18 of the +1-order and −1-order main beams have the same size and are projected at centers of the photodetectors 12 and 15, respectively as shown in FIG. 7B. But when the objective lens 3 moves towards the optical record medium 4, the spot 17 on the photodetector 12 becomes larger and the spot 18 on the photodetector 15 becomes smaller as illustrated in FIG. 7A, and when the objective lens 3 moves away from the optical record medium 4, the spot 17 becomes smaller and the spot 18 becomes larger as depicted in FIG. 7C. In this manner, the sizes of the beam spots 17 and 18 change in an opposite manner. Therefore, a focusing error signal FES may be derived from the following equation by the beam size method:

$$FES=(A1+A5+A6)-(A2+A3+A4) \qquad (2)$$

wherein A1, A2 and A3 are output signals of the light receiving regions 12a, 12b and 12c, respectively and A4, A5 and A6 are output signals of the light receiving regions 15a, 15b and 15c, respectively.

A tracking error signal TES may be derived from outputs of the photodetectors 11, 13, 14 and 16. That is to say, the tracking error signal TES may be derived from the following equation:

$$TES=(B1+B3)-(B2+B4) \qquad (3)$$

wherein B1, B2, B3 and B4 are output signals of the photodetectors 11, 13, 14 and 16, respectively.

In the present embodiment, a magnification β of the objective lens 3 viewed from the the optical record medium 4 to the unit 1 is set to −5.5, a distance L between the main beam spot and the sub-beam spot on the optical record medium 4 (a distance between center points of these spots) is set to 0.018 mm, a numerical aperture NA of the objective lens 3 viewed from the optical record medium 4 to the unit 1 is set to 0.082, a distance D1 between a laser emitting point of the semiconductor laser 9 and the gratings 8a is set to 1.25 mm, a thickness D2 of the optical body of the hologram optical element 8 is set to 2.0 mm, and a refractive index of the optical body of the hologram optical element 8 is set to 1.51052. Further the semiconductor laser 9 and the photodetectors 11 to 16 are formed to have dimensions illustrated in FIG. 8 as follows:

d1=300 μm, d2=485 μm, d3=120 μm, d4=30 μm, d5=22 μm, d6=56 μm, d7=36 μm, and d8=54 μm.

Now positions of images formed by the ±1-order beams emanating from the hologram pattern 8b may be calculated in the following manner. The hologram pattern 8b is formed by a plurality of concentric circles having a center of (x, y)=(−5.10, 0) from the above mentioned equation (1). It should be noted that in the present embodiment the constants F, G and H are set to 0.245, 0.024 and 0.024, respectively. When a parallel beam is made incident upon such a hologram pattern, images are formed at positions Q which may be derived in the following manner. Now it is assumed that a direction cosine of the incident light upon the hologram pattern 8b is represented by (l, m, n) and a direction cosine of exiting light is denoted by (l', m', n'), and pitches of the hologram pattern 8b in the directions x and y are respectively represented by $P_x$ and $P_y$. Then, the following equations can be obtained:

$$l'=l\pm\lambda/P_x$$
$$m'=m\pm\lambda/P_y \qquad (4)$$
$$n'=(1-l'^2-m'^2)^{1/2}$$

The pitches $P_x$ and $P_y$ of the hologram pattern 8b may be expressed as follows.

$$P_x=\lambda/(\delta f(x,y)/\delta x)=\lambda/(F+2Gx)$$

$$P_y = \lambda/(\delta f(x,y)/\delta y) = \lambda/2Hy \quad (5)$$

From the above equations (4) and (5), there are obtained the following equations:

$$l' = \pm(F+2Gx)$$

$$m' = \pm 2Hy \quad (6)$$

Therefore, in a region near the optical axis, the following equation can be obtained.

$$Q = \tfrac{1}{2}H = 20.83 \text{ min.} \quad (7)$$

Then, the position of the image becomes $(x, y, z) = (-5.10, 0, -20.8)$, so that the hologram pattern $8b$ becomes equivalent to a pattern which is formed by using a parallel reference beam and an object beam emanating from a light source provided at a position of $(x, y, z) = (-5.10, 0, -20.8)$.

When a reproducing light beam is made incident upon a hologram pattern which is formed by any reference beam and object beam, a direct image $B_1'$ and a conjugate image $B_2'$ are formed at positions $(x_1', y_1', z_1')$ and $(x_2', y_2', z_2')$, respectively, which are expressed as follows:

$$z_1' = 1/(1/z + 1/R' - 1/R)$$

$$x_1' = z_1' \cdot \eta/R' - z_1' \cdot x/z \quad (8)$$

$$y_1' = z_1' \cdot \xi/R' - z_1' \cdot y/z$$

$$z_2' = 1/(1/z + 1/R' + 1/R)$$

$$x_1' = z_2' \cdot \eta/R' - z_2' \cdot x/z \quad (9)$$

$$y_1' = z_2' \cdot \xi/R' - z_2' \cdot y/z$$

wherein a position of the reference beam source $S_0$ is expressed by $(0, 0, R)$, a position of the object B is denoted by $(x, y, z)$, and coordinates of the reproducing beam $S_r$ is expressed by $(\eta, \xi, R')$. A reference should be made to "INTRODUCTION OF HOLOGRAM", by J. ch. Vienot et al.

In the above equations (8) and (9), if the parallel reference beam is used, the object is positioned at the object point $(-5.10, 0, -20.8)$ and the return beam reflected by the optical record medium 4 is used as the reproducing beam, then, the direct image and conjugate image formed by the diffracted light rays by the hologram pattern $8b$ are formed at the following positions:

$$B_1' = (-0.56, 0, -2.29)$$

$$B_2' = (0.72, 0, -2.93)$$

Therefore, an amount d of a shift of these images formed by the $\pm 1$-order beams diffracted by the hologram pattern $8b$ viewed in the optical axis, i.e. the direction z becomes d=0.64 mm.

Figure 8:
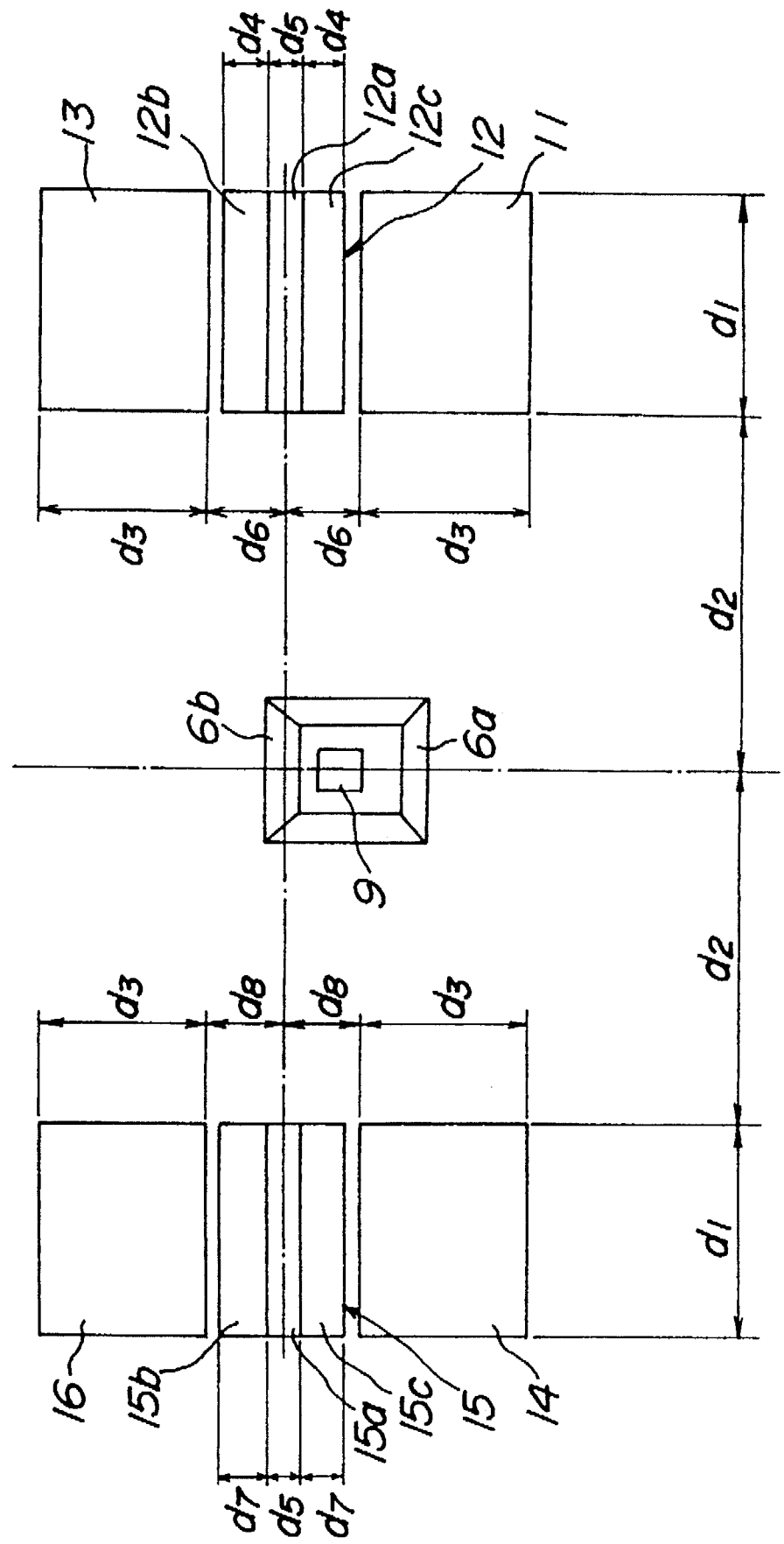
FIG. 8 is a schematic plan view depicting a detailed construction of the photodetecting means.

It should be noted that in FIG. 8, the light receiving regions $12b$, $12c$ of the photodetector 12 and the light receiving regions $15b$, $15c$ of the photodetector 15 are formed asymmetrically with each other in order to prevent a pseudo zero-cross signal from being generated in the focusing error signal.

In the present embodiment, $d/\beta^2$ is nearly equal to 0.021 mm, NA·d is about 0.052 mm and $|L \cdot \beta|$ becomes 0.099 mm.

Thus, the condition of NA·d<$|L \cdot \beta|$ is satisfied. The value of $d/\beta^2$ represents a physical amount which is substantially proportional to a twice of the detectable range of the focusing error. In the optical pick-up apparatus for use in an optical disk, a lower limit of the detectable range of the focusing error is generally set to about 0.005 mm, so that the value should be set to satisfy the condition of $d/\beta^2 > 0.01$ mm. However, if the value of $d/\beta^2$ is increased in order to increase the deractable range of the focusing error, the sensitivity of the focusing error detection is decreased. Therefore, the value of $d/\beta^2$ should have an upper limitation. The sensitivity of the focusing error detection should be larger than 0.1/µm, when a total amount of the focusing error detecting light impinging upon the photodetector is assumed to be 1. Therefore, in the beam size method, a range of the focusing error detection should be smaller than 20 µm=0.02 mm. Thus, according to the invention, 0.04 mm>$d/\beta^2$>0.01 mm should be satisfied. In the present embodiment, this condition is also satisfied.

In order to reduce the influence of the rotation of the optical pick-up apparatus about the optical axis, it is desired to make the distance L between the main beam spot and the sub-beam spot on the optical record medium as small as possible and in order to decrease the optical path length, it is desired to make the magnification $\beta$ of the objective lens 3 viewed from the optical record medium 4 to the unit 1 as small as possible. However, they could not be made sufficiently small due to the interference of the main beam and sub-beams on the photodetectors. The condition of NA·d<$|L \cdot \beta|$ provides the condition for preventing the main and sub-beam spots on the photodetectors from being superimposed with each other. In this condition, a physical amount of NA·d represents a diameter of the beam spot substantially on the photodetectors and a physical amount of $|L \cdot \beta|$ shows a distance between the main beam spot and the sub-beam spot on the photodetectors. Therefore, when the parameters L is determined to be small while the above condition NA·d<$|L \cdot \beta|$ is satisfied, the distance L can be shortened without causing the undesired interference between the main beam spot and the sub-beam spots on the photodetectors. It is apparent that the parameter L can be made smaller, if the parameter $\beta$ is made larger. However, as stated above the parameter $\beta$ could not be made large. Therefore, according to the invention, the parameter $\beta$ is determined to be as small as possible while the condition of $d/\beta^2 > 0.01$ mm is satisfied. The present embodiment also satisfies this condition.

Therefore, in the present embodiment, it is possible to shorten the distance between the main beam spot and the sub-beam spots on the optical record medium 4 without using the concave lens and without increasing the numerical aperture and magnification of the objective lens 3. Moreover, it is also possible to prevent the interference between the main beam spot and the sub-beam spots on the photodetectors, so that the tracking error can be detected accurately and the focusing error can be detected over a wide range without producing the pseudo zero-cross signal.

Figure 9A:
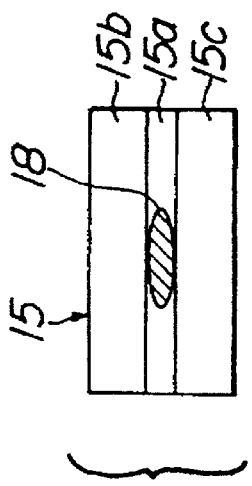
FIGS. 9A, 9B and 9C are schematic plan views showing the beam spots on the photodetector in another embodiment of the optical pick-up apparatus according to the invention.
Figure 9B:
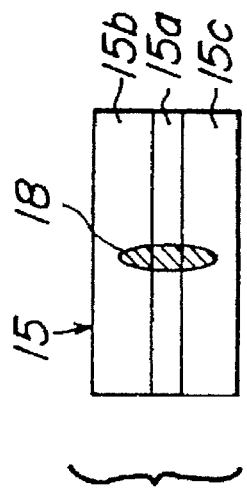
Figure 9C:
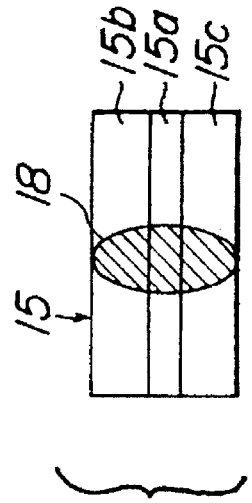

The present invention is not limited to the embodiment just explained above, but many modifications and alternations may be conceived by those skilled in the art within the scope of the invention. For instance, in the above embodiment, the hologram pattern is formed such that the +1-order beam and −1-order beam are subjected to the opposite focal power. However, according to the invention, it is also possible to give the +1-order beam and −1-order beam astigmatisms in opposite directions. The astigmatisms are determined such that an astigmatic difference s is equal to 0.64 mm. A focal line of the +1-order beam is formed at a point behind the plane of the photodetectors and a focal line of the −1-order beam is formed at a point before the plane of the photodetectors. When the objective lens is in the in-focused position, the ±1-order beam spots formed on the photodetectors 12 and 15 have the same size, shape and position as illustrated in FIG. 9B. However, when the objective lens moves towards the optical record medium, the spot 17 of the 1-order main beam becomes large while the spot 18 of the −1-order main beam is prolonged in the direction x as shown in FIG. 9A, and when the objective lens moves away from the optical record medium, the spot 18 becomes large and the spot 17 is prolonged in the direction x. In this manner, the dimension of these spots 17 and 18 viewed in the direction y change in an opposite manner in dependence upon the direction of the defocus. Therefore, also in the present embodiment, the focusing error and tracking error can be detected in the same manner as that of the previous embodiment.

As explained above, the optical pick-up apparatus according to the invention can be small in size and cheap in cost, while the tracking error can be detected correctly without causing the interference of the main beam spot and sub-beam spots on the photodetectors and the focusing error can be detected over a wide range by satisfying the condition $NA \cdot d < |L \cdot \beta|$ or $NA \cdot d < |L \cdot \beta|$ under the condition of 0.04 mm $d/\beta^2 > 0.01$ mm or 0.04 mm $s/\beta^2 > 0.01$ mm.

What is claimed is:

1. An optical pick-up apparatus for recording and/or reading information on and/or from an optical record medium, said apparatus comprising:

a semiconductor substrate having a surface;

a semiconductor laser provided on said surface of semiconductor substrate and emitting a laser beam;

diffraction grating means for dividing said laser beam into a single main beam for recording and/or reading information on and/or from an optical record medium and first and second sub-beams for detecting a tracking error;

a converging optical system for projecting said main beam and first and second sub-beams emanating from said diffraction grating means onto said optical record medium as fine beam spots and receiving the main beam and first and second sub-beams reflected by said optical record medium;

a hologram means for diffracting the main beam and first and second sub-beams reflected by said optical record medium and received by said converging optical system into ±1-order main beams, ±1-order first sub-beams and ±1-order second sub-beams and giving said +1-order main beam and first and second sub-beams and said −1-order main beam and first and second sub-beams focal powers in opposite directions; and a photodetecting means including first and second photodetectors receiving said ±1-order main beams, third and fourth photodetectors receiving ±1-order first sub-beams and fifth and sixth photodetectors receiving ±1-order second sub-beams; wherein the optical pick-up apparatus is constructed to satisfy a condition:

$$NA \cdot d < |L \cdot \beta|$$

wherein L (in mm) is a distance between a spot of the main beam and a spot of one of the first and second sub-beams on the optical record medium, NA is a numerical aperture of said converging optical system on a side of the semiconductor laser, β is a magnification of said converging optical system viewed from the optical record medium to the semi-conductor laser and d is a deviation of focal points of the +1-order and −1-order main beams viewed along an optical axis.

2. An optical pick-up apparatus according to claim 1, wherein said apparatus is constructed to satisfy a condition of $d/\beta^2 > 0.01$ mm.

3. An optical pick-up apparatus according to claim 2, wherein said apparatus is constructed to satisfy a condition of $0.04 \text{ mm} > d/\beta^2$.

4. An optical pick-up apparatus according to claim 3, wherein said apparatus is constructed to satisfy a condition of $s/\beta^2 > 0.01$ mm.

5. An optical pick-up apparatus according to claim 4, wherein said apparatus is constructed to satisfy a condition of $0.04 \text{ mm} > s/\beta^2$.

6. An optical pick-up apparatus according to claim 1, wherein said semiconductor substrate, semiconductor laser, diffraction grating means, hologram means and photodetecting means are formed as a single optical unit.

7. An optical pick-up apparatus according to claim 6, wherein said semiconductor laser is arranged on a bottom of a depression formed in a surface of the semiconductor substrate, and an inclined side wall of said depression is formed as a reflecting mirror for reflecting the laser beam emitted by the semiconductor laser in a direction perpendicular to the surface of the semiconductor substrate.

8. An optical pick-up apparatus according to claim 7, wherein said first to sixth photodetectors of the photodetecting means are formed in the surface of the semiconductor substrate such that the first, third and fifth photodetectors are provided on one side of the semiconductor laser and the second, fourth and sixth photodetectors are arranged on the other side of the semiconductor laser.

9. An optical pick-up apparatus for recording and/or reading information on and/or from an optical record medium, said apparatus comprising:

a semiconductor substrate having a surface;

a semiconductor laser provided on said surface of semiconductor substrate and emitting a laser beam;

diffraction grating means for dividing said laser beam into a single main beam for recording and/or reading information on and/or from an optical record medium and first and second sub-beams for detecting a tracking error;

a converging optical system for projecting said main beam and first and second sub-beams emanating from said diffraction grating means onto said optical record medium and receiving the main beam and first and second sub-beams reflected by said optical record medium;

a hologram means for diffracting the main beam and first and second sub-beams reflected by said optical record medium and received by said converging optical system into ±1-order main beams, ±1-order first sub-beams and ±1-order second sub-beams and giving said +1-order main beam and first and second sub-beams and said −1-order main beam and first and second sub-beams astigmatisms in opposite directions; and a photodetecting means including first and second photodetectors receiving said ±1-order main beams, third and fourth photodetectors receiving ±1-order first sub-beams and fifth and sixth photodetectors receiving ±1-order second sub-beams; wherein the optical pick-up apparatus is constructed to satisfy a following condition:

$$NA \cdot s < |L \cdot \beta|$$

wherein L (in mm) is a distance between a spot of the main beam and a spot of one of the first and second sub-beams on the optical record medium, NA is a numerical aperture of said converging optical system on a side of the semiconductor laser, $\beta$ is a magnification of said converging optical system viewed from the optical record medium to the semi-conductor laser and s is an astigmatic difference of the +1-order and −1-order main beams emanating from said hologram means viewed along an optical axis.

10. An optical pick-up apparatus according to claim 9, wherein said semiconductor substrate, semiconductor laser, diffraction grating means, hologram means and photodetecting means are formed as a single optical unit.

* * * * *